(12) United States Patent
Aritomo et al.

(10) Patent No.: US 11,189,860 B2
(45) Date of Patent: Nov. 30, 2021

(54) METHOD OF MANUFACTURING SECONDARY BATTERY

(71) Applicants: SANYO Electric Co., Ltd., Daito (JP); Panasonic Corporation, Kadoma (JP)

(72) Inventors: Ryota Aritomo, Hyogo (JP); Yoshitaka Shinyashiki, Hyogo (JP)

(73) Assignees: SANYO Electric Co., Ltd., Daito (JP); PANASONIC CORPORATION, Kadoma (JP)

( * ) Notice: Subject to any disclaimer, the term of this patent is extended or adjusted under 35 U.S.C. 154(b) by 275 days.

(21) Appl. No.: 16/320,759

(22) PCT Filed: Jul. 25, 2017

(86) PCT No.: PCT/JP2017/026750
§ 371 (c)(1),
(2) Date: Jan. 25, 2019

(87) PCT Pub. No.: WO2018/021263
PCT Pub. Date: Feb. 1, 2018

(65) Prior Publication Data
US 2019/0165424 A1 May 30, 2019

(30) Foreign Application Priority Data
Jul. 28, 2016 (JP) .............................. JP2016-148743

(51) Int. Cl.
*H01M 10/0585* (2010.01)
*H01M 10/04* (2006.01)
*H01M 10/28* (2006.01)

(52) U.S. Cl.
CPC ... *H01M 10/0585* (2013.01); *H01M 10/0413* (2013.01); *H01M 10/0436* (2013.01); *H01M 10/281* (2013.01)

(58) Field of Classification Search
CPC ......... H01M 10/0585; H01M 10/0413; H01M 10/0436; H01M 10/281
See application file for complete search history.

(56) References Cited

U.S. PATENT DOCUMENTS

2002/0119367 A1* 8/2002 Watanabe ......... H01M 10/0436
429/129
2014/0272507 A1 9/2014 Ku et al.
(Continued)

FOREIGN PATENT DOCUMENTS

CN      104054205 A    9/2014
JP      10-275628 A    10/1998
(Continued)

OTHER PUBLICATIONS

International Search Report dated Oct. 10, 2017, issued in counterpart application No. PCT/JP2017/026750 (2 pages).
(Continued)

*Primary Examiner* — Helen Oi K Conley
(74) *Attorney, Agent, or Firm* — Westerman, Hattori, Daniels & Adrian, LLP

(57) ABSTRACT

The method of manufacturing a secondary battery includes a layering step of forming an electrode body in which positive electrode plates and negative electrode plates are alternately layered with separators interposed in between, the layering step includes, a step of preparing a negative electrode sheet having negative electrode active material layers formed on two surfaces of a negative electrode core body, a step of forming a layered sheet by adhering a first separator and a second separator on two surfaces of the negative electrode sheet with adhesion layers in between, the layered sheet including the first separator, the negative electrode sheet, and the second separator, a step of forming a layered body by cutting the layered sheet, the layered body having two surfaces of the negative electrode plates sand-
(Continued)

wiched between the first and second separators, and a step of forming the electrode body using the layered body.

10 Claims, 13 Drawing Sheets

(56) References Cited

U.S. PATENT DOCUMENTS

2015/0340663 A1 11/2015 Minagata et al.
2018/0131031 A1 5/2018 Ku et al.

FOREIGN PATENT DOCUMENTS

| | | |
|---|---|---|
| JP | 2003-223926 A | 8/2003 |
| JP | 2012-156128 A | 8/2012 |
| JP | 2014-534604 A | 12/2014 |
| JP | 2016-103425 A | 6/2016 |
| WO | 2012/081331 A1 | 6/2012 |
| WO | 2014/002647 A1 | 1/2014 |

OTHER PUBLICATIONS

English translation of Chinese Office Action dated May 7, 2021, issued in counterpart CN application No. 201780046817.4. (4 pages).

\* cited by examiner

METHOD OF MANUFACTURING SECONDARY BATTERY

TECHNICAL FIELD

The present disclosure relates to a method of manufacturing a secondary battery including an electrode body having a plurality of positive electrode plates, a plurality of negative electrode plates, and separators.

BACKGROUND ART

A layered electrode body is manufactured by alternately layering positive electrode plates and the negative electrode plates on each other with separators interposed in between.

However, since the separators are configured to be thinner as the secondary battery is configured to have higher energy density, the handling of the separators during a layering step of the separators is becoming difficult. Furthermore, in order to prevent short-circuiting from occurring between the positive electrode plates and the negative electrode plates, clearances need to be provided between end portions of the separators, and the end portions of the positive electrode plates and the negative electrode plates. Accordingly, portions that do not contribute to the generation of electricity increase, and the volume energy density decreases. Additionally, since the positive electrode plates, the separators, and the negative electrode plates are layered repeatedly, fabrication of the electrode body takes time and the productivity decreases.

As a method of manufacturing a layered electrode body, there is a method of manufacturing in which a long separator is folded alternately to form a zigzag structure, and the positive electrode plates and the negative electrode plates are alternately interposed between the zigzag structure of the separator (Patent Literature 1, for example). Using the above method allows the thinned separator to be used as it is in an elongated state; accordingly, the separator can be handled readily.

CITATION LIST

Patent Literature

PTL 1: Japanese Published Unexamined Patent Application No. 2016-103425

SUMMARY OF INVENTION

Technical Problem

However, in the layered electrode body manufactured by using the separators having the zigzag structure, folded back portions of the separator are formed on both end portion sides of the electrode body. Since the folded back portions of the separator are portions that do not contribute to the generation of electricity and the issue, that is, the decrease in the volume energy density, still remains.

The present disclosure has been made in view of the above issue and a main object thereof is to provide a method of manufacturing a secondary battery that has a high volume energy density and a high productivity.

Solution to Problem

A method of manufacturing a secondary battery according to the present disclosure is a method of manufacturing a secondary battery including an electrode body having a plurality of positive electrode plates, a plurality of negative electrode plates, and separators, and includes a layering step of forming the electrode body in which the positive electrode plates and the negative electrode plates are alternately layered on each other with the separators interposed in between. The layering step includes the following steps:

(A) a step of preparing a negative electrode sheet having negative electrode active material layers formed on two surfaces of a long negative electrode core body, (B) a step of forming a layered sheet by adhering a long first separator and a long second separator on two surfaces of the negative electrode sheet with adhesion layers in between, the layered sheet including the first separator, the negative electrode sheet, and the second separator, (C) a step of forming a layered body by cutting the layered sheet, the layered body having two surfaces of the negative electrode plates sandwiched between the first and second separators, and (D) a step of forming the electrode body, the electrode body having the positive electrode plates and the negative electrode plates alternately layered on each other with the separators interposed in between, by using the layered body.

Another method of manufacturing a secondary battery according to the present disclosure is a method of manufacturing a secondary battery including an electrode body having a plurality of positive electrode plates, a plurality of negative electrode plates, and separators, and includes a layering step of forming the electrode body in which the positive electrode plates and the negative electrode plates are alternately layered on each other with the separators interposed in between. The layering step includes the following steps:

(A) a step of forming a layered sheet by disposing the plurality of negative electrode plates at intervals between a long first separator and a long second separator and by adhering the long first separator and the long second separator to two surfaces of the plurality of negative electrode plates with adhesion layers interposed in between, the layered sheet including the first separator, the plurality of negative electrode plates, and the second separator, (B) a step of forming a layered body by cutting the layered sheet at portions where the negative electrode plates are not disposed, the layered body having the two surfaces of the negative electrode plates sandwiched between the first and second separators, and (C) a step of forming the electrode body, the electrode body having the positive electrode plates and the negative electrode plates alternately layered on each other with the separators interposed in between, by using the layered body.

Advantageous Effects of Invention

According to the present disclosure, a method of manufacturing a secondary battery having a high volume energy density and a high productivity can be provided.

DESCRIPTION OF EMBODIMENTS

Hereinafter, example embodiments of the present disclosure will be described in detail with reference to the drawings. Note that the present disclosure is not limited to the following example embodiments. Furthermore, modifications can be appropriately made within the range in which the effect of the present disclosure can be attained.

First Example Embodiment

FIGS. 1(a) to 1(e) are cross-sectional views schematically illustrating a method of manufacturing a secondary battery according to a first example embodiment of the present disclosure. The method of manufacturing the secondary battery according to the present example embodiment includes a layering step that forms an electrode body in which positive electrode plates and negative electrode plates are alternately layered with separators interposed in between.

Figure 1A:
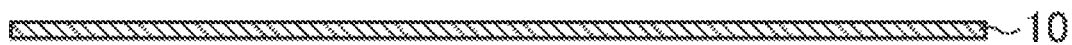
FIGS. 1(a) to 1(e) are cross-sectional views schematically illustrating a method of manufacturing a secondary battery according to a first example embodiment.

As illustrated in FIG. 1(a), a negative electrode sheet 10 having negative electrode active material layers (not shown) formed on two surfaces of a long negative electrode core body (not shown) is first prepared.

Figure 1B:
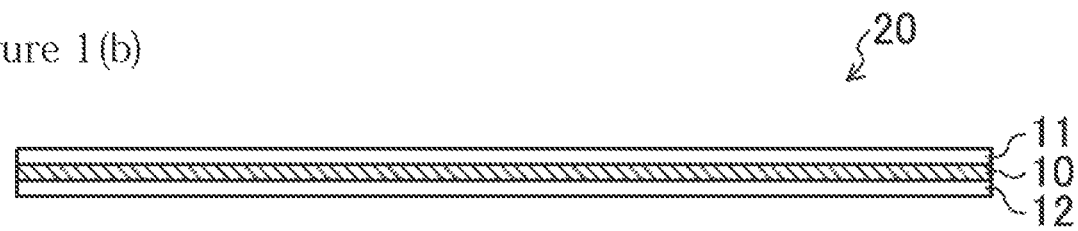

Subsequently, as illustrated in FIG. 1(b), a long first separator 11 and a long second separator 12 are each adhered to a corresponding one of the two surfaces of the negative electrode sheet 10 with an adhesion layer (not shown) interposed in between. With the above, a layered sheet 20 including the first separator 11, the negative electrode sheet 10, and the second separator 12 is formed.

Note that the adhesion layers are formed in advance on two principle surfaces of the negative electrode sheet 10, or on at least the first principal surfaces of the first separator 11 and the second separator 12 to which the negative electrode sheet 10 is to be adhered. The adhesion layers can be formed by coating an adhesive agent on the principle surfaces of the negative electrode sheet 10, the first separator 11, and the second separator 12, for example. Note that polyvinylidene fluoride (PVDF), carboxymethyl cellulose (CMC), or polyvinyl alcohol (PVA), for example, can be used as the adhesive agent.

The layered sheet 20 may be formed by arranging each of the first separator 11 and the second separator 12 on the corresponding one of the two principle surfaces of the negative electrode sheet 10 and simultaneously adhering the first separator 11 and the second separator 12 onto the two principle surfaces of the negative electrode sheet 10. The first separator 11 and the second separators 12 can be simultaneously adhered onto the two principle surfaces of the negative electrode sheet 10 by, in a state in which the negative electrode sheet 10 is interposed between the first and second separators 11 and 12, passing the first and second separators 11 and 12 between a pair of press rollers. With the above, the formation time of the layered sheet 20 can be shortened.

Note that the adhesion layer do not have to be formed on the entire surface of the negative electrode sheet 10, the first separator 11, or the second separator 12. The adhesion layers may be formed on portions of the first principal surfaces of the negative electrode sheet 10, the first separator 11, and the second separator 12 to such an extent that peeling from each other did not happen. Note that an area of the adhered portion with respect to an area of the portion where the negative electrode active material layer and the first separator 11 oppose each other is preferably 30% or more, more preferably is 60% or more, and most preferably is 90% or more. Furthermore, an area of the adhered portion with respect to an area of the portion where the negative electrode active material layer and the second separator 12 oppose each other is preferably 30% or more, more preferably is 60% or more, and most preferably is 90% or more.

Figure 1C:
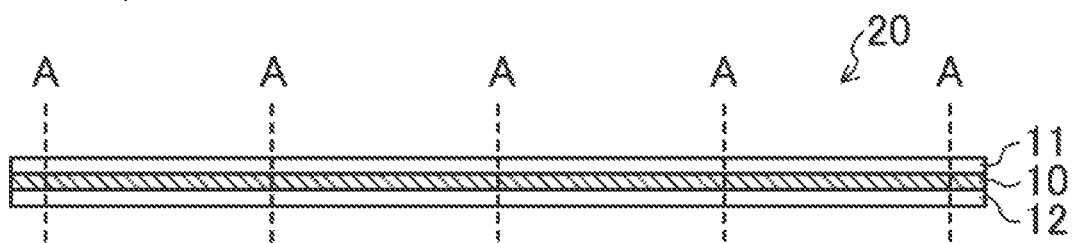
Figure 1D:
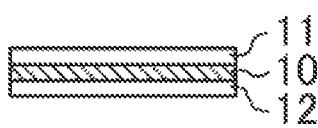

Subsequently, as shown in FIG. 1(c), the layered sheet 20 is cut at positions indicated by broken lines A. With the above, as illustrated in FIG. 1(d), a layered body 30 in which two surfaces of a negative electrode plate 10 are sandwiched between the first and second separators 11 and 12 is formed. A measure for cutting the layered sheet 20 is not limited in particular, and can be performed by using a laser beam, a cutter, or the like, for example.

Incidentally, when the layered sheet 20 is cut, stress is applied to the portions indicated by the broken lines A where the layered sheet 20 are cut. Accordingly, the layered sheet 20 may become peeled and the negative electrode active material layer may fall off from the above portions. Accordingly, in order to prevent the above, the adhesion layers are, desirably, formed at least at portions where the layered sheet 20 are cut.

Figure 1E:
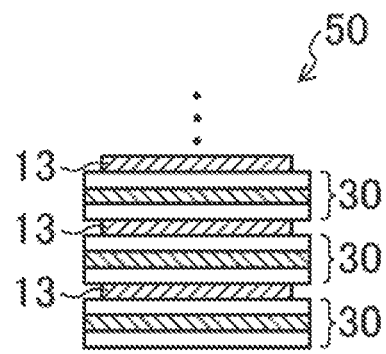

Subsequently, as illustrated in FIG. 1(e), an electrode body 50 in which the positive electrode plates and the negative electrode plates are alternately layered with separators interposed in between is formed by alternately layering the layered bodies 30 and the positive electrode plates 13 on each other. A secondary battery can be manufactured by housing the electrode body 50 inside a battery case together with the electrolytic solution.

According to the present example embodiment, as illustrated in FIG. 1(d), an end portion of the negative electrode plate 10 and end portions of the first and second separators 11 and 12 are flush with each other in the layered body 30. Furthermore, the size of each positive electrode plate 13 is usually designed to be smaller than the size of each negative electrode plate 10. Accordingly, as illustrated in FIG. 1(e), in the electrode body 50 formed by alternately layering the layered bodies 30 and the positive electrode plates 13 on each other, there are no unnecessary portions in the first and second separators 11 and 12 that do not contribute to the generation of electricity. Accordingly, a secondary battery with a high volume energy density can be obtained.

Furthermore, as illustrated in FIG. 1(c), the first and second separators 11 and 12 constitute the layered body 30 together with the negative electrode plate 10 in an integral manner. Accordingly, in the layering step forming the electrode body 50, the first and second separators 11 and 12 are not handled singly. Accordingly, handling of the separators becomes easy in the layering step of forming the electrode body 50.

Furthermore, as illustrated in FIG. 1(e), both end portions of the negative electrode plates 10 and the positive electrode plates 13 are in an open state in the electrode body 50. Accordingly, compared with a layered electrode body manufactured using a separator having a zigzag structure, an ease of injection of the electrolytic solution is excellent.

Additionally, as illustrated in FIG. 1(e), the electrode body 50 is formed by alternately layering the layered body 30 and the positive electrode plates 13 on each other. Accordingly, productivity can be improved compared with the layered type electrode body fabricated by repetitively layering the positive electrode plates, the separators, and the negative electrode plates on each other.

As described above, according to the present example embodiment, a secondary battery in which the volume energy density is high, in which handling of the separators is easy, in which the ease of injection of the electrolytic solution is excellent, and in which productivity is high can be manufactured.

Note that in the present example embodiment, desirably, negative electrode tabs are formed in the negative electrode sheet 10 before attaching the first separator 11 and the second separator 12 to the negative electrode sheet 10.

Figure 2A:
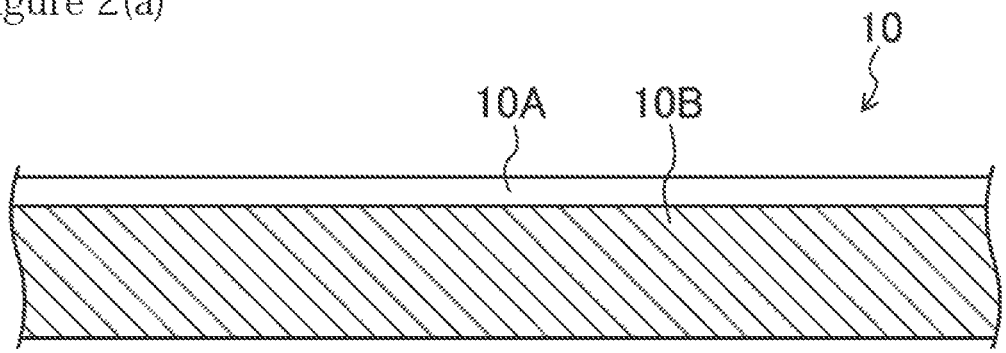
FIGS. 2(a) to 2(c) are plan views illustrating an example of a step of adhering a first separator and a second separator after forming negative electrode tabs on a negative electrode sheet plate in advance.
Figure 2B:
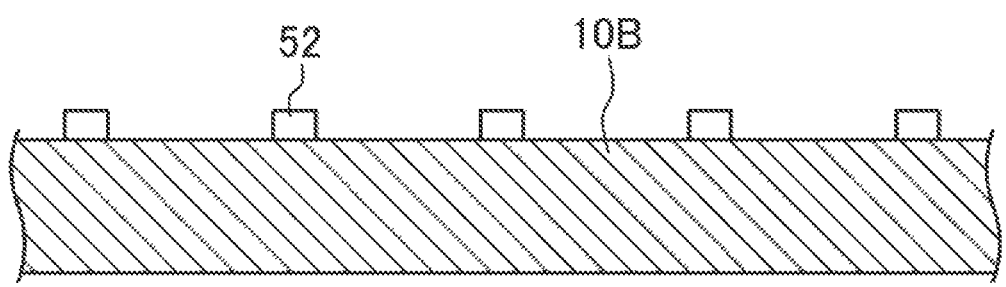
Figure 2C:
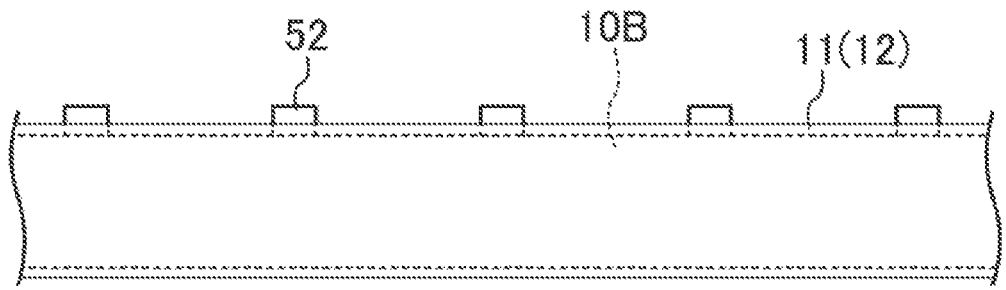

FIGS. 2(a) to 2(c) are plan views illustrating an example of a step of adhering the first separator 11 and the second separator 12 after forming the negative electrode tabs on the negative electrode sheet 10 in advance.

As illustrated in FIG. 2(a), negative electrode active material layers 10B are first formed on two surfaces of a long negative electrode core body 10A. In so doing, the negative electrode active material layers 10B are formed so that an exposed portion of the negative electrode core body 10A appears along a longitudinal direction at one end in a width direction.

Subsequently, as illustrated in FIG. 2(b), negative electrode tabs 52 are formed by cutting the exposed portion of the negative electrode core body 10A into a predetermined shape. In the above, the negative electrode tabs 52 are formed so as to protrude from the one end portion of the negative electrode core body 10A in the width direction. As a result, a plurality of negative electrode tabs 52 are formed at predetermined intervals in the longitudinal direction of the negative electrode core body 10A (the negative electrode sheet 10).

Subsequently, as illustrated in FIG. 2(c), the first separator 11 and the second separator 12 are adhered to the two principal surfaces of the negative electrode sheet 10 in which the negative electrode tabs 52 are formed. Note that the first separator 11 and the second separator 12 are, desirably, adhered to the two surfaces of the negative electrode active material layers 10B. With the above, the first separator 11 and the second separator 12 can be configured to not be adhered to the negative electrode core body 10A. Furthermore, the first separator 11 and the second separator 12 may be adhered to the negative electrode core body 10A.

Furthermore, as illustrated in FIG. 2(c), desirably, both end portions of the first separator 11 and the second separator 12 in the width direction protrude outside both end portions of the negative electrode active material layers 10B in the width direction. With the above, short-circuiting between positive electrode tabs and the negative electrode plates 10 or short-circuiting between the negative electrode tabs 52 and the positive electrode plates 13 on the side on which the negative electrode tabs 52 are formed can be prevented reliably. In particular, since the area of each positive electrode plate 13 in plan view is smaller than the area of each negative electrode plate 10 in plan view, short-circuiting between the positive electrode tabs and the negative electrode plates 10 is likely to occur; however, by having the configuration described above, short-circuiting between the positive electrode tabs and the negative electrode plates 10 can be prevented effectively.

Furthermore, in order to improve the volume energy density of the battery, desirably, the positive electrode tabs and the negative electrode tabs are arranged in a curved manner. However, when the positive electrode tabs and the negative electrode tabs are arranged in a curved manner, short-circuiting between the positive electrode tabs and the negative electrode plates 10 or short-circuiting between the negative electrode tabs 52 and the positive electrode plates 13 is likely to occur. As illustrated in FIG. 2(c), in the direction in which the negative electrode tabs 52 protrude, end portions of the first separator 11 and the second separator 12 on the distal end side of the negative electrode tabs 52 protrude to the distal end side of the negative electrode tabs 52 more than the end portions of the negative electrode active material layers 10B on the distal end side of the negative electrode tabs 52; accordingly, short-circuiting between the positive electrode tabs and the negative electrode plates 10 or short-circuiting between the negative electrode tabs 52 and the positive electrode plates 13 can be prevented more effectively.

Furthermore, since a base portion side (a negative electrode active material layer 10B side) of the negative electrode tabs 52 is interposed between the first separator 11 and the second separator 12, when the first separator 11 and the second separator 12 are adhered to the negative electrode sheet 10, the negative electrode tabs 52 can be prevented from being bent or peeled at the base portions.

On the other hand, on a side opposite to a side on which the negative electrode tabs 52 are formed, contact between a bottom portion of the battery case and the positive electrode plates 13 or the negative electrode plates 10 can be prevented more reliably. Furthermore, as described later, it is particularly effective when the number of insulating sheets disposed between the electrode body 50 and a bottom portion of a battery case 90 is one. Furthermore, even if the electrode body 50 were to move inside the battery case towards the bottom portion side due to vibration, impact, and the like, the first and second separators 11 and 12 become buffer materials, and the damage, breakage, and the like of the electrode body 50 can be suppressed.

First Modification of First Example Embodiment

Figure 3A:
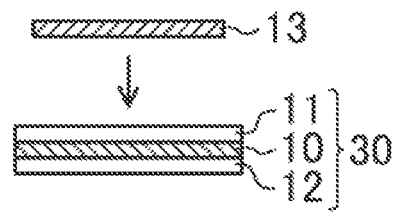
FIGS. 3(a) to 3(c) are cross-sectional views schematically illustrating a method of forming an electrode body according to a first modification of the first example embodiment.
Figure 3B:
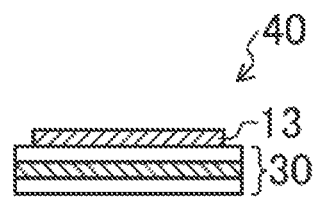
Figure 3C:
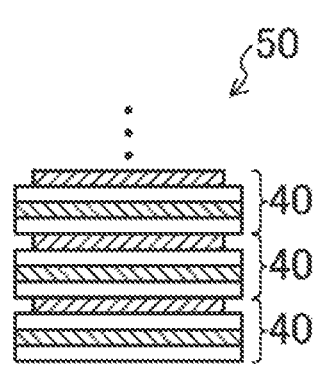

FIGS. 3(a) to 3(c) are cross-sectional views schematically illustrating a method of forming an electrode body according to a first modification of the first example embodiment.

As illustrated in FIG. 3(a), the first modification further includes a step of adhering the layered body 30 and positive electrode plates 13 to each other with an adhesion layer (not shown) in between. Note that the layered body 30 is the layered body 30 formed in the first example embodiment (FIG. 1(d)). With the above, as illustrated in FIG. 3(b), a layered body unit 40 in which the layered body 30 and the positive electrode plate 13 are layered is formed.

Subsequently, as illustrated in FIG. 3(c), by sequentially layering the layered body units 40 on each other, the electrode body 50 in which the positive electrode plates and the negative electrode plates are alternately layered on each other with the separators interposed in between is formed.

According to the first modification, in addition to the effect of the first example embodiment, the formation time of the electrode body 50 can be shortened further by configuring the layered body unit 40 as a unit serving as a layer unit for forming the electrode body 50.

Second Modification of First Example Embodiment

FIGS. 4(a) to 4(d) are cross-sectional views schematically illustrating a method of forming an electrode body according to a second modification of the first example embodiment. The second modification provides another method of forming the layered body unit 40 according to the first modification.

Figure 4A:
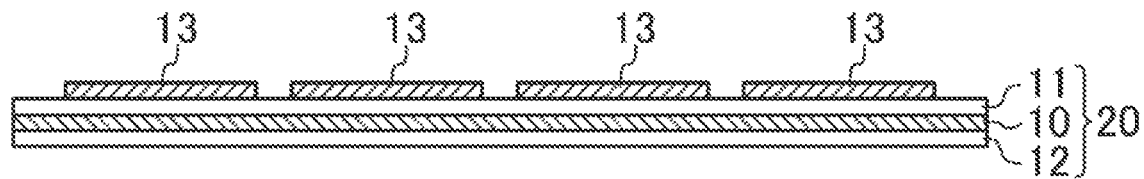
FIGS. 4(a) to 4(d) are cross-sectional views schematically illustrating a method of forming an electrode body according to a second modification of the first example embodiment.

As illustrated in FIG. 4(a), the second modification further includes a step of layering the plurality of positive electrode plates 13 on the layered sheet 20 while disposing the plurality of positive electrode plates 13 with spaces in between. Note that layered sheet 20 is the layered sheet 20 formed in the first example embodiment (FIG. 1(b)).

Figure 4B:
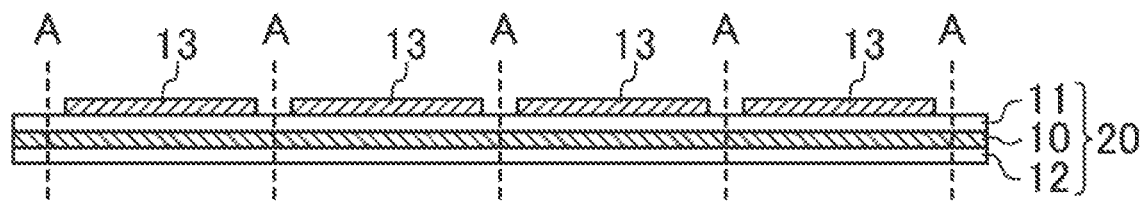
Figure 4C:
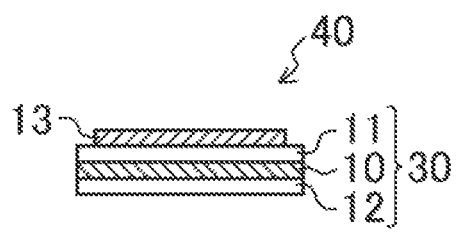

Subsequently, as illustrated in FIG. 4(b), the layered sheet 20 is cut at portions (at positions indicated by broken lines A) where the positive electrode plates 13 are not disposed. With the above, as illustrated in FIG. 4(c), the layered body unit 40 in which the positive electrode plate 13 is layered on the layered body 30 is formed.

Figure 4D:
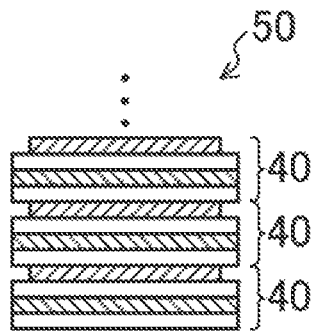

Subsequently, as illustrated in FIG. 4(d), by sequentially layering the layered body units 40 on each other, the electrode body 50 in which the positive electrode plates and the negative electrode plates are alternately layered on each other with the separators interposed in between is formed.

According to the second modification, in addition to the effect of the first example embodiment, since a plurality of layered body units 40 can be simultaneously formed in the step of cutting the layered sheet 20, the formation time of the layered body unit 40 can be shortened. Furthermore, the formation time of the electrode body 50 can be shortened further by configuring the layered body unit 40 as a unit serving as a layer unit for forming the electrode body 50.

Note that after disposing a single positive electrode plate 13 on the layered sheet 20, the layered sheet 20 can be cut before the next positive electrode plate 13 is disposed on the layered sheet 20.

Third Modification of First Example Embodiment

FIGS. 5(a) to 5(d) are cross-sectional views schematically illustrating a method of forming a layered body according to a third modification of the first example embodiment.

Figure 5A:
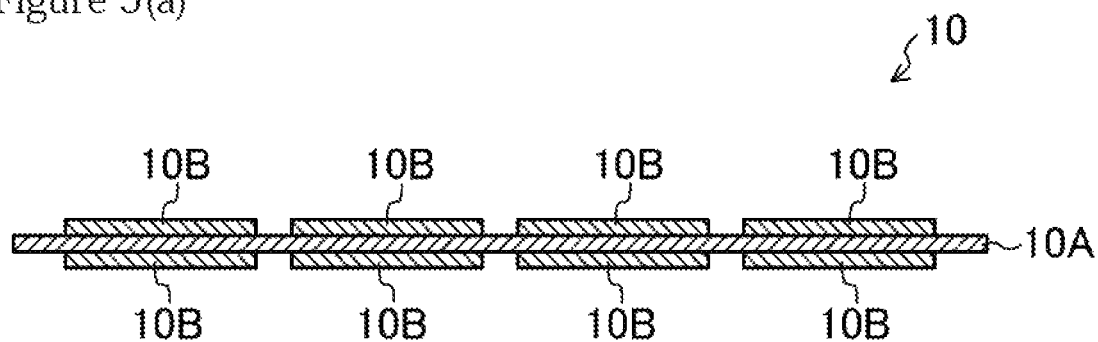
FIGS. 5(a) to 5(d) are cross-sectional views schematically illustrating a method of forming a layered body according to a third modification of the first example embodiment.

As illustrated in FIG. 5(a), a negative electrode sheet 10 having negative electrode active material layers 10B formed in an intermittent manner on two surfaces of a long negative electrode core body 10A is first prepared.

Figure 5B:
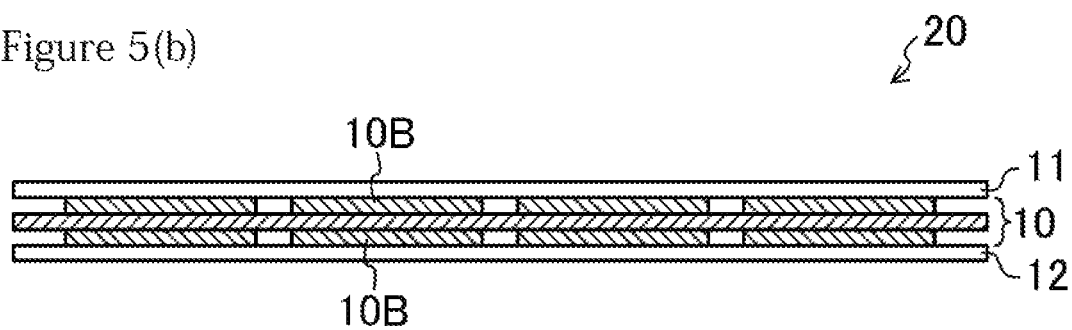

Subsequently, as illustrated in FIG. 5(b), a long first separator 11 and a long second separator 12 are each adhered to a corresponding one of the two surfaces of the negative electrode sheet 10 with an adhesion layer interposed in between. With the above, a layered sheet 20 including the first separator 11, the negative electrode sheet 10, and the second separator 12 is formed.

Figure 5C:
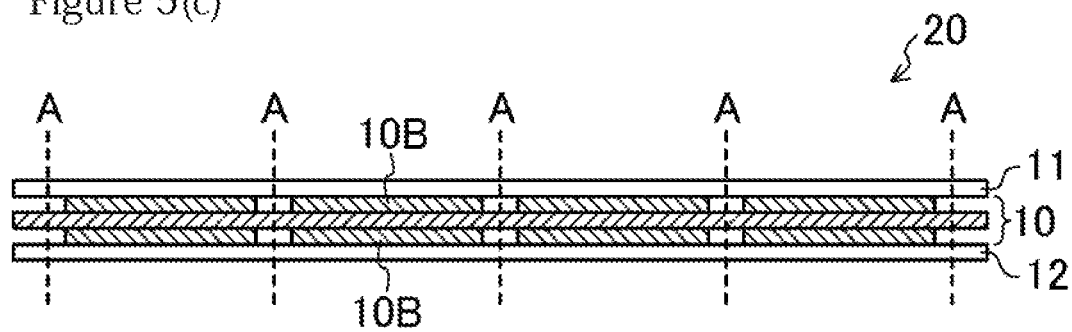
Figure 5D:
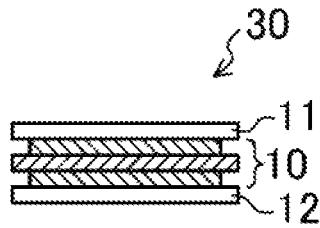

Subsequently, as illustrated in FIG. 5(c), the layered sheet 20 is cut at portions (at positions indicated by broken lines A) where the negative electrode active material layers 10B are not formed. With the above, as illustrated in FIG. 5(d), a layered body 30 in which the two surfaces of the negative electrode plate 10 are sandwiched between the first and second separators 11 and 12 is formed.

Subsequently, similar to the step illustrated in FIG. 1(e), an electrode body 50 in which the positive electrode plates and the negative electrode plates are alternately layered with separators interposed in between is formed by alternately layering the layered bodies 30 and the positive electrode plates 13 on each other.

According to the third modification, in addition to the effect of the first example embodiment, since the negative electrode active material layers 10B are not formed at the positions where the layered sheet 20 is cut, when the layered sheet 20 is cut, there is no risk of the negative electrode active material layers 10B falling off, and a highly reliable secondary battery can be obtained.

Second Example Embodiment

FIGS. 6(a) to 6(e) are cross-sectional views schematically illustrating a method of manufacturing a secondary battery according to a second example embodiment of the present disclosure. The method of manufacturing the secondary battery according to the present example embodiment includes a layering step that forms an electrode body in which positive electrode plates and negative electrode plates are alternately layered with separators interposed in between.

Figure 6A:
FIGS. 6(a) to 6(e) are cross-sectional views schematically illustrating a method of manufacturing a secondary battery according to a second example embodiment.

As illustrated in FIG. 6(a), first, a plurality of negative electrode plates 10 are disposed at intervals. The negative electrode plates 10 disposed in such a manner can be obtained by cutting, at intervals, a long negative electrode sheet that is being conveyed, for example.

Figure 6B:
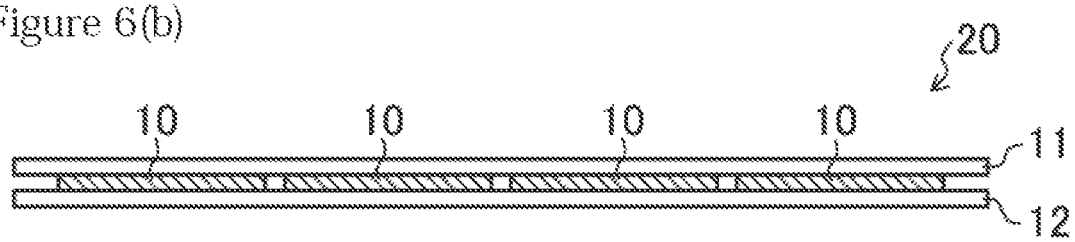

Subsequently, as illustrated in FIG. 6(b), a long first separator 11 and a long second separator 12 are each adhered to the two surfaces of the negative electrode sheets 10 with an adhesion layer (not shown) interposed in between. With the above, the layered sheet 20 including the first separator 11, the plurality of negative electrode plates 10, and the second separator 12 is formed.

Figure 6C:
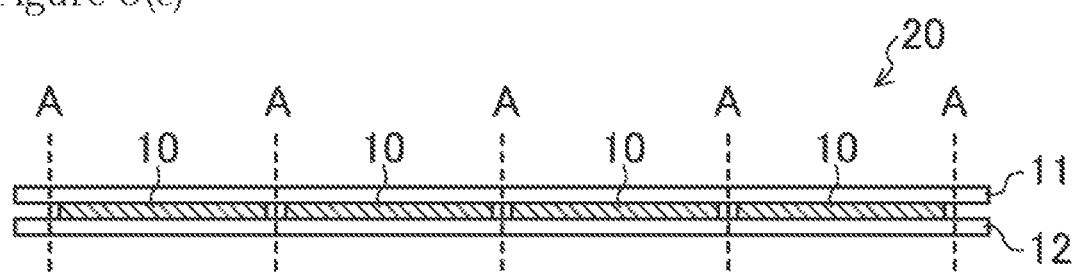
Figure 6D:
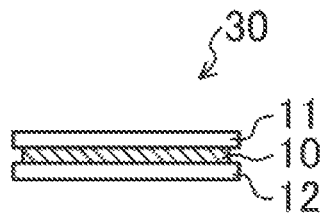

Subsequently, as illustrated in FIG. 6(c), the layered sheet 20 is cut at portions (at positions indicated by broken lines A) where the negative electrode plates 10 are not disposed. With the above, as illustrated in FIG. 6(d), the layered body 30 in which the two surfaces of the negative electrode plate 10 are sandwiched between the first and second separators 11 and 12 is formed.

Figure 6E:
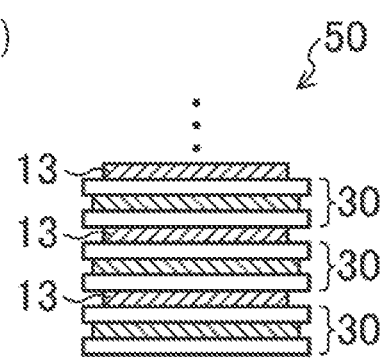

Subsequently, as illustrated in FIG. 6(e), the electrode body 50 in which the positive electrode plates and the negative electrode plates are alternately layered with separators interposed in between is formed by alternately layering the layered bodies 30 and the positive electrode plates 13 on each other. The secondary battery can be manufactured by accommodating the electrode body 50 inside a battery case together with an electrolytic solution.

According to the present example embodiment, as illustrated in FIG. 6(*d*), the first and second separators 11 and 12 constitute the layered body 30 together with the negative electrode plate 10 in an integral manner. Accordingly, in the layering step forming the electrode body 50, the first and second separators 11 and 12 are not handled singly. Accordingly, even when the separators are thinned as the secondary battery is configured to have high energy density, separators can be easily handled in the layering step of forming the electrode body 50.

Furthermore, as illustrated in FIG. 6(*e*), both end portions of the negative electrode plates 10 and the positive electrode plates 13 are in an open state in the electrode body 50. Accordingly, compared with a layered electrode body manufactured using a separator having a zigzag structure, an ease of injection of the electrolytic solution is excellent.

Additionally, as illustrated in FIG. 6(*e*), the electrode body 50 can be formed by alternately layering the layered body 30 and the positive electrode plates 13 on each other. Accordingly, productivity can be improved compared with the layered type electrode body fabricated by repetitively layering the positive electrode plates, the separators, and the negative electrode plates on each other.

Furthermore, as illustrated in FIG. 6(*c*), since the negative electrode plates 10 do not exist at the positions where the layered sheet 20 is to be cut, in cutting the layered sheet 20, it is only sufficient that only the separators 11 and 12 are cut. Accordingly, while the layered sheet 20 can be cut readily, the negative electrode active material layers do not fall off during cutting; accordingly, a highly reliable secondary battery can be obtained.

As described above, according to the present example embodiment, a secondary battery in which the separators can be handled readily, in which the ease of injecting the electrolytic solution is excellent, and in which the productivity and reliability are high can be manufactured.

Note that the layered sheet 20 can be cut after disposing the positive electrode plates 13 on the layered sheet 20 illustrated in FIG. 6(*b*) and at positions opposing the negative electrode sheet 10.

First Modification of Second Example Embodiment

Figure 7A:
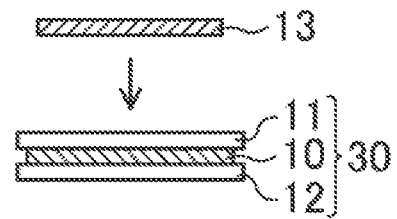
FIGS. 7(a) to 7(c) are cross-sectional views schematically illustrating a method of forming an electrode body according to a first modification of the second example embodiment.
Figure 7B:
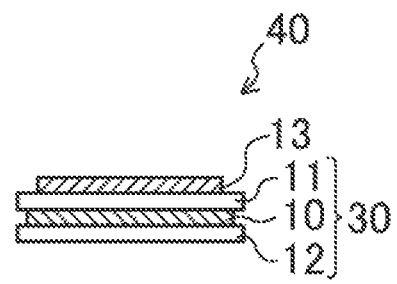
Figure 7C:
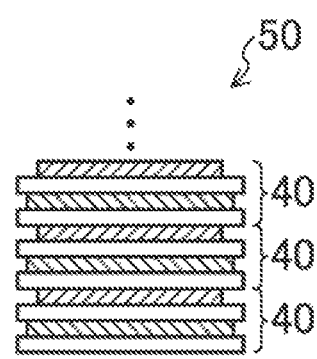
Figure 8A:
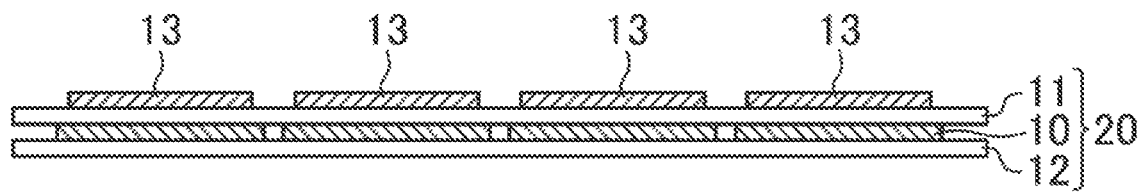
FIGS. 8(a) to 8(d) are cross-sectional views schematically illustrating a method of forming an electrode body according to a second modification of the second example embodiment.
Figure 8B:
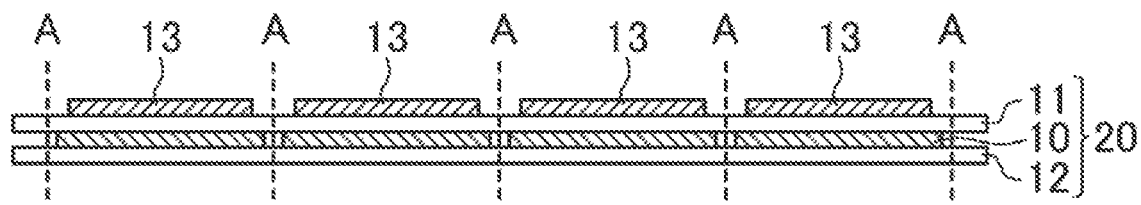
Figure 8C:
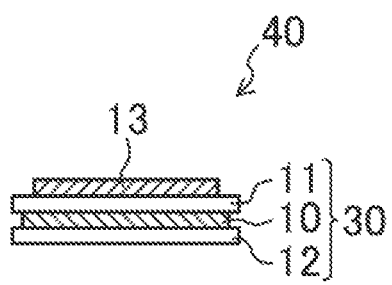
Figure 8D:
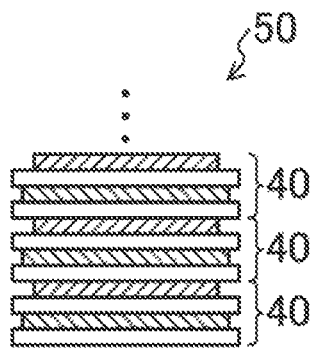

FIGS. 7(*a*) to 7(*c*) are cross-sectional views schematically illustrating a method of forming an electrode body according to a first modification of the second example embodiment.

As illustrated in FIG. 7(*a*), the first modification further includes a step of adhering the layered body 30 and positive electrode plates 13 to each other with an adhesion layer (not shown) in between. Note that the layered body 30 is the layered body 30 formed in the second example embodiment (FIG. 6(*d*)). With the above, as illustrated in FIG. 7(*b*), a layered body unit 40 in which the layered body 30 and the positive electrode plate 13 are layered is formed.

Subsequently, as illustrated in FIG. 7(*c*), by sequentially layering the layered body units 40 on each other, the electrode body 50 in which the positive electrode plates and the negative electrode plates are alternately layered on each other with the separators interposed in between is formed.

According to the first modification, in addition to the effect of the second example embodiment, the formation time of the electrode body 50 can be shortened further by configuring the layered body unit 40 as a unit serving as a layer unit for forming the electrode body 50.

Second Modification of Second Example Embodiment

FIGS. 8(*a*) to 8(*d*) are cross-sectional views schematically illustrating a method of forming an electrode body according to a second modification of the second example embodiment. The second modification provides another method of forming the layered body unit 40 according to the first modification.

As illustrated in FIG. 8(*a*), the second modification further includes a step of layering the plurality of positive electrode plates 13 on the layered sheet 20 while disposing the plurality of positive electrode plates 13 with spaces in between. Note that the layered sheet 20 is the layered sheet 20 formed in the second example embodiment (FIG. 6(*b*)).

Subsequently, as illustrated in FIG. 8(*b*), the layered sheet 20 is cut at portions (at positions indicated by broken lines A) where the positive electrode plates 13 are not disposed. With the above, as illustrated in FIG. 8(*c*), the layered body unit 40 in which the positive electrode plate 13 is layered on the layered body 30 is formed.

Subsequently, as illustrated in FIG. 8(*d*), by sequentially layering the layered body units 40 on each other, the electrode body 50 in which the positive electrode plates and the negative electrode plates are alternately layered on each other with the separators interposed in between is formed.

According to the second modification, in addition to the effect of the second example embodiment, since a plurality of layered body units 40 can be simultaneously formed in the step of cutting the layered sheet 20, the formation time of the layered body unit 40 can be shortened. Furthermore, the formation time of the electrode body 50 can be shortened further by configuring the layered body unit 40 as a unit serving as a layer unit for forming the electrode body 50.

Note that after disposing a single positive electrode plate 13 on the layered sheet 20 and at a position opposing the corresponding negative electrode plate 10, the layered sheet 20 can be cut before the next positive electrode plate 13 is disposed on the layered sheet 20.

Figure 9:
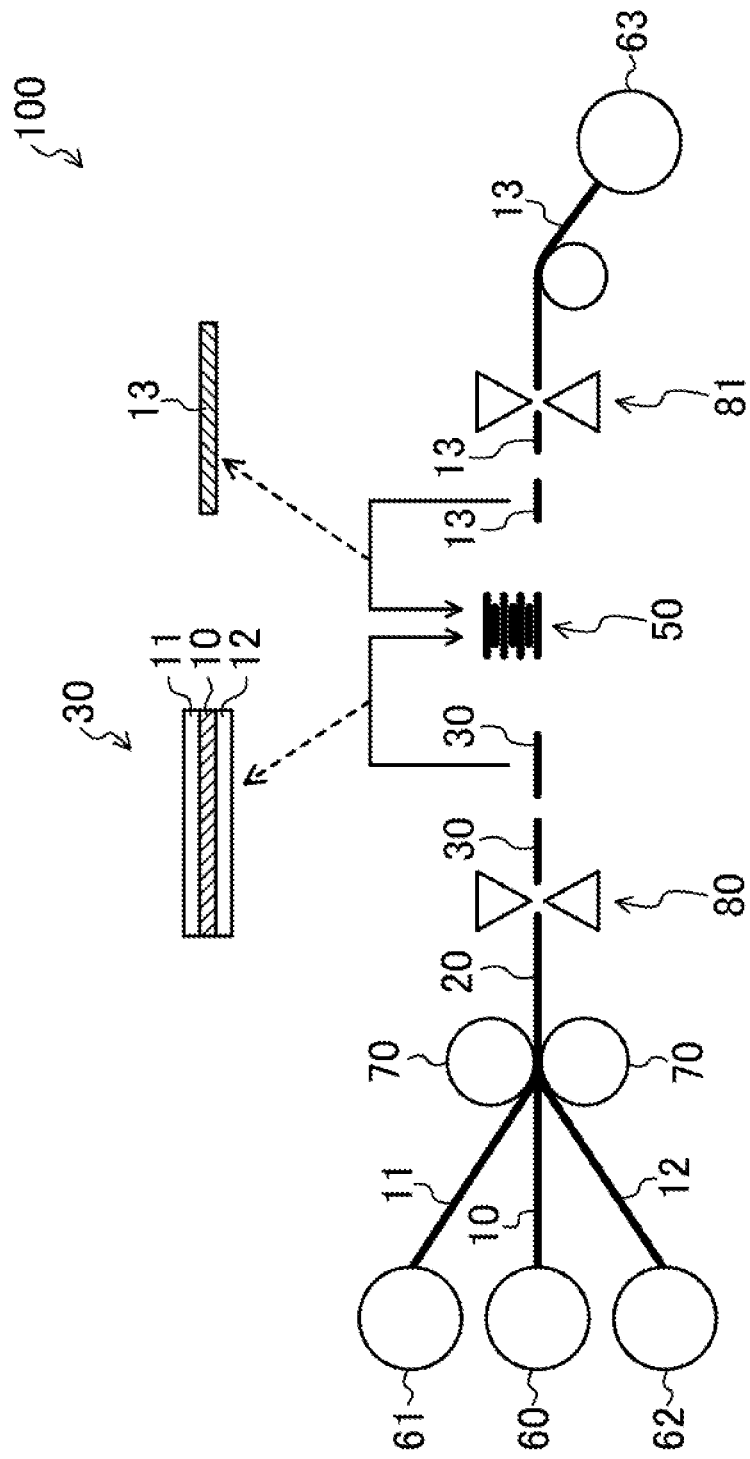
FIG. 9 is a diagram schematically illustrating a configuration of a manufacturing apparatus that manufactures the electrode body according to the first example embodiment.
Figure 10:
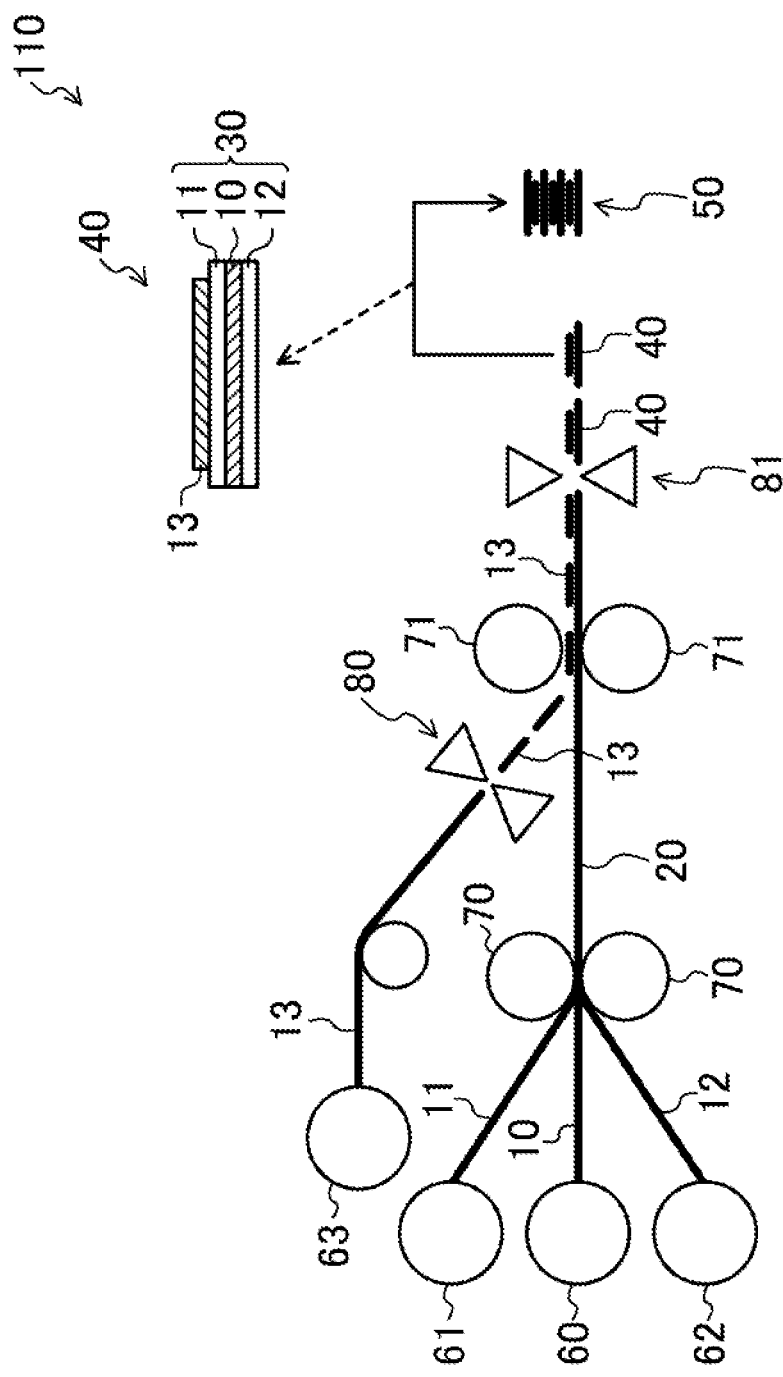
FIG. 10 is a diagram schematically illustrating a configuration of a manufacturing apparatus that manufactures the electrode body according to the second modification of the first example embodiment.
Figure 11:
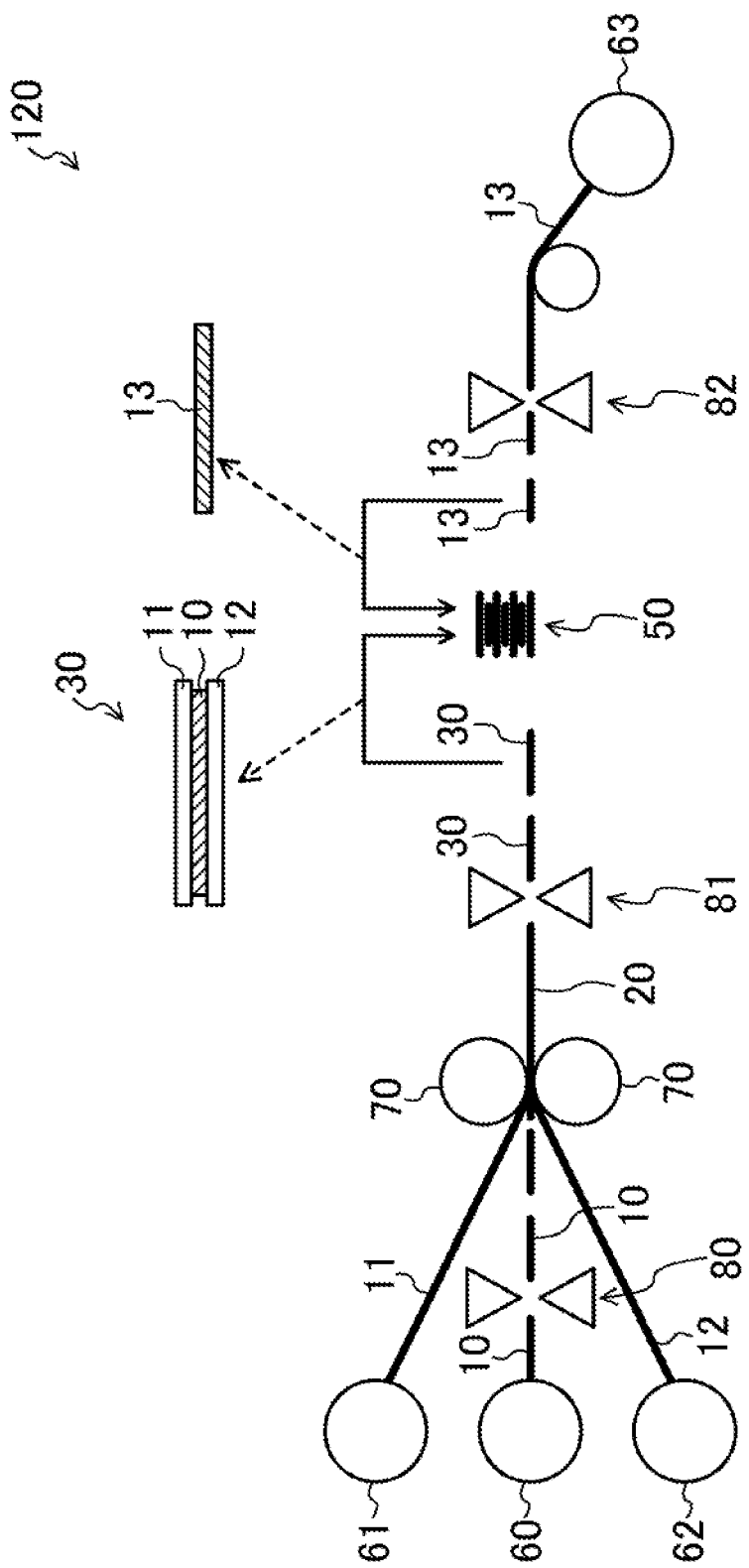
FIG. 11 is a diagram schematically illustrating a configuration of, a manufacturing apparatus that manufactures the electrode body according to the second example embodiment.

Referring next to FIGS. 9 to 11, an example of a manufacturing apparatus for manufacturing an electrode body in which the positive electrode plates and the negative electrode plates are alternately layered on each other with the separators interposed in between will be described.

FIG. 9 is a diagram schematically illustrating a configuration of a manufacturing apparatus 100 that manufactures the electrode body 50 according to the first example embodiment illustrated in FIGS. 1(*a*) to 1(*e*).

As illustrated in FIG. 9, the negative electrode sheet 10, the first separator 11, and the second separator 12 drawn out from the rolls 60, 61, and 62, respectively, are pinched between a pair of press rollers 70. Note that before pinching, adhesion layers are formed in advance on the two principal surfaces of the negative electrode sheet 10 or on at least the first principal surfaces of the first separator 11 and the second separator 12 to which the negative electrode sheet 10 is to be adhered.

By heating and pressing the first separator 11 and the second separator 12 with the pair of press rollers 70, the first separator 11 and the second separator 12 are simultaneously adhered to the two surfaces of the negative electrode sheet 10 with the adhesion layers in between. With the above, the layered sheet 20 illustrated in FIG. 1(*b*) is formed.

Subsequently, the layered sheet 20 is cut by a cutting member 80 provided midway of the conveyance. With the above, the layered body 30 illustrated in FIG. 1(d) is formed. Note that the cutting member 80 may use a laser beam, a cutter, or the like.

On the other hand, the positive electrode sheet 13 drawn out from a roll 63 is cut by a cutting member 81 provided midway of the conveyance, and the positive electrode plate 13 is formed.

Finally, the layered bodies 30 and the positive electrode plates 13 are alternately layered on each other using a transporting member (not shown), so that the electrode body 50 illustrated in FIG. 1(e) is formed.

Note that it is desirable that adhesion layers are also provided on the principal surfaces in the first separator 11 and second separator 12 that oppose the positive electrode plates 13. Furthermore, it is desirable that the first separators 11 and the positive electrode plates 13, and the second separators 12 and the positive electrode plates 13 are adhered to each other by heating and pressing the electrode body 50 from both sides in a layered direction.

Note that in a case in which the adhesion layer is provided on each of the two principal surfaces of the first separator 11 and the second separator 12, it is desirable that a polytetrafluoroethylene coating, a diamond-like carbon (DLC) coating, or the like is applied to the surfaces of the press rollers 70. With the above, the adhesion layers can be prevented from adhering to the press rollers 70.

FIG. 10 is a diagram schematically illustrating a configuration of a manufacturing apparatus 110 that manufactures the electrode body 50 according to the second modification of the first example embodiment illustrated in FIGS. 4(a) to 4(d).

Note that the manufacturing apparatus 110 is the same as the manufacturing apparatus 100 until the layered sheet 20 illustrated in FIG. 1(b) is formed; accordingly, description thereof will be omitted.

As illustrated in FIG. 10, the positive electrode sheet 13 drawn out from the roll 63 is cut with the cutting member 80 provided midway of the conveyance, and the positive electrode plate 13 is formed. Subsequently, the positive electrode plates 13 are conveyed at predetermined intervals with a conveying member (not shown).

The layered sheet 20, and the positive electrode plates 13 conveyed at predetermined intervals are pinched between a pair of press rollers 71. Note that before being pinched, an adhesion layer is formed on the principal surface of the first separator 11 or the principal surface of the positive electrode plates 13 in advance.

By heating and pressing the positive electrode plates 13 and the second separator 12 with the pair of press rollers 71, as illustrated in FIG. 4(a), the positive electrode plates 13, disposed with the predetermined intervals in between, are adhered onto the layered sheet 20. Subsequently, the portions where the positive electrode plates 13 are not disposed are cut with the cutting member 81 provided midway of the conveyance. With the above, as illustrated in FIG. 4(c), the layered body unit 40 in which the positive electrode plate 13 is layered on the layered body 30 is formed.

Finally, the electrode body 50 as illustrated in FIG. 4(d) is formed by sequentially layering the layered body units 40 on each other by using a transporting member (not shown).

FIG. 11 is a diagram schematically illustrating a configuration of a manufacturing apparatus 120 that manufactures the electrode body 50 according to the second example embodiment illustrated in FIGS. 6(a) to 6(e).

As illustrated in FIG. 11, the negative electrode sheet 10 drawn out from the roll 60 is cut with the cutting member 80 provided midway of the conveyance, and the negative electrode plate 10 is formed. Subsequently, the negative electrode plates 10 are conveyed at predetermined intervals with a conveying member (not shown). The negative electrode plates 10 conveyed at predetermined intervals are pinched between the pair of press rollers 70 together with the first separator 11 and the second separator 12 that have been drawn out from the rolls 61 and 62, respectively. Note that before pinching, adhesion layers are formed in advance on the two surfaces of the negative electrode plate 10 or on at least the first principal surfaces of the first separator 11 and the second separator 12 to which the negative electrode plate 10 is to be adhered.

By heating and pressing the first separator 11 and the second separator 12 with the pair of press rollers 70, the first separator 11 and the second separator 12 are adhered to the two surfaces of the plurality of negative electrode sheets 10 with the adhesion layers in between. With the above, the layered sheet 20 illustrated in FIG. 6(b) is formed.

Subsequently, the layered sheet 20 is cut by the cutting member 81 provided midway of the conveyance. With the above, the layered body 30 illustrated in FIG. 6(d) is formed.

On the other hand, the positive electrode sheet 13 drawn out from the roll 63 is cut by a cutting member 82 provided midway of the conveyance, and the positive electrode plate 13 is formed.

Finally, the layered bodies 30 and the positive electrode plates 13 are alternately layered on each other by using a transporting member (not shown), so that the electrode body 50 as illustrated in FIG. 6(e) is formed.

Figure 12:
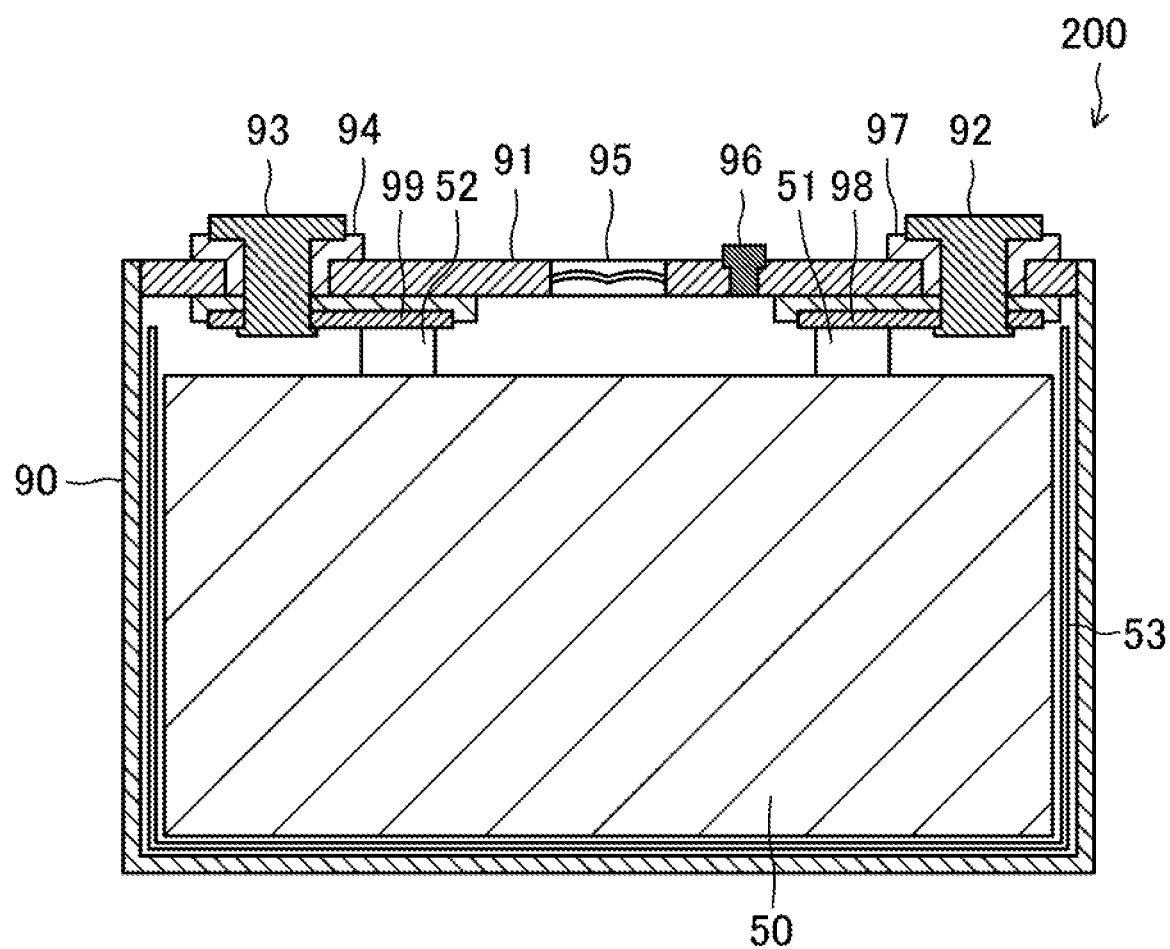
FIG. 12 is a cross-sectional view schematically illustrating a configuration of a secondary battery including an electrode body.

FIG. 12 is a cross-sectional view schematically illustrating a configuration of a secondary battery including an electrode body formed by a layering step according to the present example embodiment. Note that the secondary battery in the present example embodiment is not limited to any particular type and can be, for example, applied to secondary batteries such as lithium ion secondary batteries, nickel-hydrogen secondary batteries, and the like.

As illustrated in FIG. 12, in a secondary battery 200 according to the present example embodiment, the electrode body 50, in which the positive electrode plates and the negative electrode plates are alternately layered on each other with separators in between, is accommodated inside the battery case 90 together with an electrolytic solution (not shown). An opening portion of the battery case 90 is sealed by a sealing body 91, and a positive electrode terminal 92 and a negative electrode terminal 93 are fixed to the sealing body 91 through resin members 97 and 94, respectively. The positive electrode plates and the negative electrode plates are connected to the positive electrode conductive member 98 and the negative electrode conductive member 99, respectively, through the positive electrode tabs 51 and the negative electrode tabs 52, respectively. Since the positive electrode conductive member 98 and the negative electrode conductive member 99 are connected to the positive electrode terminal 92 and the negative electrode terminal 93, respectively, the positive electrode plates and the negative electrode plates are connected to the positive electrode terminal 92 and the negative electrode terminal 93, respectively. An injection hole through which an electrolytic solution is injected is provided in the sealing body 91. After injecting the electrolytic solution, the injection hole is sealed with a sealing member 96. Furthermore, a gas discharge valve 95 that releases pressure when the pressure inside the battery case 90 rises is provided in the sealing body 91.

In the present example embodiment, desirably, the negative electrode tabs 52 protruding from the negative electrode plates are curved and are connected to a portion disposed substantially parallel to the sealing body 91 in the negative electrode conductive member 99. Furthermore, desirably, the positive electrode tabs 51 protruding from the positive electrode plates are curved and are connected to a portion disposed substantially parallel to the sealing body 91 in the positive electrode conductive member 98. With the above, a secondary battery having a higher volume energy density can be obtained.

Furthermore, in a case in which the battery case 90 is made of metal, it is desirable that an insulating member 53 is disposed between the electrode body 50 and the battery case 90. The insulating member 53 is desirably a resin sheet. Furthermore, desirably, the insulating member 53 is formed by folding a sheet-shaped insulation sheet into a box shape.

Figure 13:
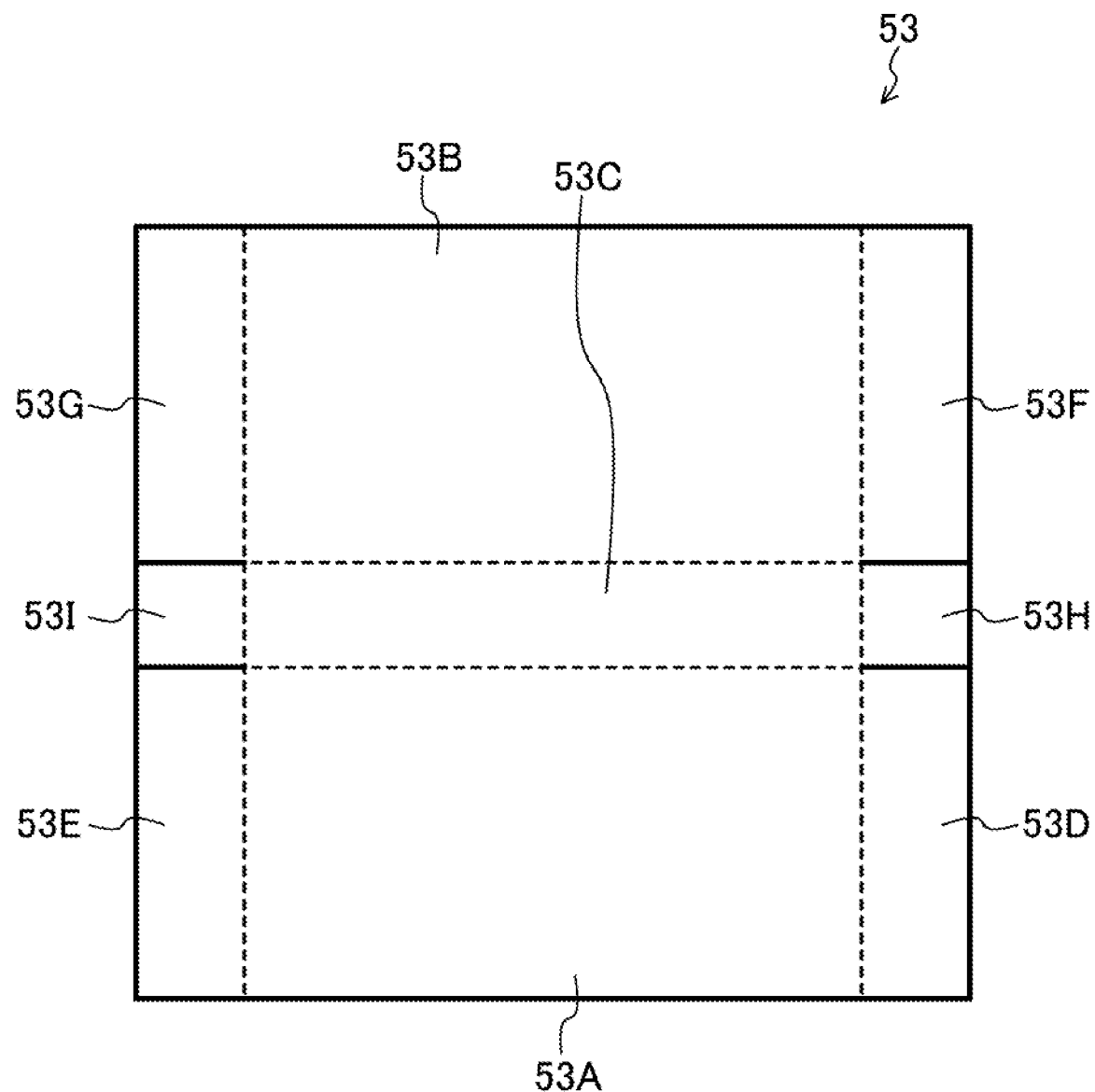
FIG. 13 is a developed few of an insulating member formed of a resin sheet.

FIG. 13 is a developed view of an insulating member 53 formed of a resin sheet. By folding the insulation sheet at the broken lines in the drawing, a box-shaped insulating member 53 is formed. Note that the solid line portions (except for the outer edges) in the figure are portions to be cut. The insulating member 53 formed in the above manner is formed into a box shape including a front surface 53A, a back surface 53B, a bottom surface 53C, and first to sixth lateral surfaces 53D to 53I. Note that such a box-shaped insulating member 53 is disposed so that the opening portion is on the sealing body 91 side.

In such a box-shaped insulating member 53, since the first lateral surface 53D and the third lateral surface 53F, and the second lateral surface 53E and the fourth lateral surface 53G overlap each other, insulation sheet is disposed in double layers between the electrode body 50 and the lateral surface (short side face) of the battery case 90. Accordingly, as illustrated in FIG. 1(d), even when both end portions of the negative electrode plates 10 and both end portions of the first and second separators 11 and 12 are flush with each other in the layered body 30, since the insulation sheet is doubled, the negative electrode plates 10 and the battery case 90 can be reliably prevented from coming in contact with each other.

On the other hand, the insulation sheet is single between the electrode body 50 and the bottom surface of the battery case 90. Accordingly, as illustrated in FIG. 2(c), desirably, the end portions of the first and second separators 11 and 12 protrude to the outside (the bottom portion side of the battery case 90) than the end portions of the negative electrode plates 10.

Note that the fifth lateral surface 53H and the sixth lateral surface 53I do not necessarily have to be provided; however, by providing the above, the insulation sheet is threefold between the electrode body 50 on the bottom portion side and the lateral surfaces of the battery case 90. With the above, the electrode body 50 on the bottom portion side and the battery case 90 can be prevented from coming in contact with each other in a more reliable manner. Furthermore, by disposing the fifth lateral surface 53H and the sixth lateral surface 53I on the outer side with respect to the first and third lateral surfaces and the second and fourth lateral surfaces, the ease of inserting the electrode body 50 into the battery case 90 can be improved.

Although the present disclosure has been described through the preferred example embodiments, such description is not a limitation and, naturally, various modifications can be made.

For example, in the example embodiments described above, as illustrated in FIG. 1(c), the layered sheet 20 is cut at positions illustrated by the broken lines A. In such a case, the negative electrode sheet 10 and the first and second separators 11 and 12 of different materials need to be cut. Accordingly, instead of cutting the negative electrode sheet 10 and the first and second separators 11 and 12 all at once, cutting may be performed in a stepwise manner. In other words, the first and second separators 11 and 12 may be cut first and, subsequently, the negative electrode sheet 10 may be cut.

Furthermore, in the present example embodiment, known configurations can be used for the negative electrode plates 10, the positive electrode plates 13, and the first and second separators 11 and 12. The negative electrode core body 10A constituting the negative electrode plate 10 is, desirably, formed of metal and is, desirably, formed of copper or a copper alloy. The negative electrode active material layer 10B constituting the negative electrode plate 10 preferably contains a negative electrode active material and a binder. The negative electrode active material is desirably a carbon material, a silicon material, or the like. It is desirable that the binder is a resin binder, and rubber-based binder or the like is particularly desirable.

The first separator 11 and the second separator 12 are preferably resin separators and are preferably polyolefin separators.

The positive electrode plate 13 desirably includes the positive electrode core body and the positive electrode active material layers formed on the two principal surfaces of the positive electrode core body. The positive electrode core body is preferably made of metal and preferably is made of aluminum or an aluminum alloy. The positive electrode active material layer preferably contains a positive electrode active material, a conductive material, and a binder. The positive electrode active material is desirably a lithium-transition metal composite oxide. The conductive material is desirably a carbon material. As the binder, a resin binder is preferable, and polyvinylidene fluoride or the like is particularly preferable.

REFERENCE SIGNS LIST 10 negative electrode sheet (negative electrode plate)
10A negative electrode core body
10B negative electrode active material layer
11 first separator
12 second separator
13 positive electrode sheet (positive electrode plate)
20 layered sheet
30 layered body
40 layered body unit
50 electrode body
51 positive electrode tab
52 negative electrode tab
53 insulating member
60 to 63 roll
70, 71 press roller
80 to 82 cutting member
90 battery case
91 sealing body
92 positive electrode terminal
93 negative electrode terminal
95 gas discharge valve
96 sealing member
97, 94 resin member
98 positive electrode conductive member
99 negative electrode conductive member
100, 110, 120 electrode body manufacturing apparatus
200 secondary battery

The invention claimed is:

1. A method of manufacturing a secondary battery including an electrode body having a plurality of positive electrode plates, a plurality of negative electrode plates, and separators, the method comprising:
   a layering step of forming the electrode body in which the positive electrode plates and the negative electrode plates are alternately layered with the separators interposed in between; and
   the layering step including,
   (A) a step of preparing a long negative electrode sheet having negative electrode active material layers formed intermittently on two surfaces of a long negative electrode core body, so as to create interval portions where the negative electrode active material layers are not formed, wherein negative electrode tabs formed of a portion of the long negative electrode core body are formed in the long negative electrode sheet and on one lateral surface of the long negative electrode sheet in a width direction,
   (B) a step of forming a layered sheet by adhering a long first separator and a long second separator on two surfaces of the long negative electrode sheet with adhesion layers in between, the layered sheet including the long first separator, the long negative electrode sheet, and the long second separator,
   (C) a step of forming a layered body, in which two surfaces of a portion cut from the long negative electrode sheet to constitute a negative electrode plate are sandwiched between corresponding portions cut from the long first and second separators, by cutting the layered sheet at the interval portions where the negative electrode active material layers are not formed, and
   (D) a step of forming the electrode body, the electrode body having the positive electrode plates and the negative electrode plates alternately layered on each other with the separators interposed in between, by using the layered body.

2. The method of manufacturing a secondary battery according to claim 1, wherein
   in the step in (B), the negative electrode sheet on which the adhesion layers are formed in advance on two principle surfaces thereof, or the first separator and the second separator that have the adhesion layers formed in advance on principle surfaces thereof to be adhered to the negative electrode sheet are used.

3. The method of manufacturing a secondary battery according to claim 1, wherein
   the step in (B) includes a step of disposing the first separator and the second separator on the two principle surfaces of the negative electrode sheet and simultaneously adhering the first separator and the second separator to the two principle surfaces of the negative electrode sheet.

4. The method of manufacturing a secondary battery according to claim 2, wherein
   the adhesion layers are formed in advance before cutting the layered body at least at portions in the negative electrode sheet that are to be cut.

5. The method of manufacturing a secondary battery according to claim 1, wherein
   in the step in (B), both end portions of the first separator and the second separator in the width direction protrude outside both end portions of the negative electrode active material layers in the width direction.

6. The method of manufacturing a secondary battery according to claim 1, further comprising:
   a step (E) of accommodating the layered body inside a battery case after the step in (D), wherein
   the step (E) includes a step of disposing an insulating member between the electrode body and the battery case, and
   the insulating member is formed by folding an insulation sheet into a box shape, and the insulation sheet is disposed in double layers between the electrode body and lateral surface of the battery case.

7. The method of manufacturing a secondary battery according to claim 1, wherein
   the step in (D) includes a step of forming the electrode body in which the positive electrode plates and the negative electrode plates are alternately layered on each other with the separators interposed in between, by alternately layering the layered body and the positive electrode plates on each other.

8. The method of manufacturing a second battery according to claim 1, wherein
   the step in (D) includes,
   a step of forming a layered body unit having the layered body and the positive electrode plates layered on each other by adhering the layered body and the positive electrode plates to each other with adhesion layers interposed in between, and
   a step of forming the electrode body, in which the positive electrode plates and the negative electrode plates are alternately layered on each other with the separators interposed in between, by sequentially layering the layered body unit.

9. The method of manufacturing a secondary battery according to claim 1, wherein
   the step in (B) further includes a step of layering the plurality of positive electrode plates disposed at intervals on the layered sheet,
   the step in (C) includes a step of forming a layered body unit in which the positive electrode plates are layered on the layered body, by cutting the layered sheet at portions where the positive electrode plates are not disposed, and
   the step in (D) includes a step of forming the electrode body in which the positive electrode plates and the negative electrode plates are alternately layered on each other with the separators interposed in between, by sequentially layering the layered body unit.

10. The method of manufacturing a secondary battery according to claim 1, wherein
    the step in (B) further includes a step of disposing the positive electrode plates on the layered sheet at positions opposing the negative electrode plates,
    the step in (C) includes a step of forming a layered body unit in which the positive electrode plates are layered on the layered body, by cutting the layered sheet at portions where the positive electrode plates are not disposed, and
    the step in (D) includes a step of forming the electrode body in which the positive electrode plates and the negative electrode plates are alternately layered on each other with the separators interposed in between, by sequentially layering the layered body unit.

* * * * *